April 3, 1934.  F. L. EICH  1,953,471
OPTICAL INSTRUMENT
Filed Jan. 5, 1932
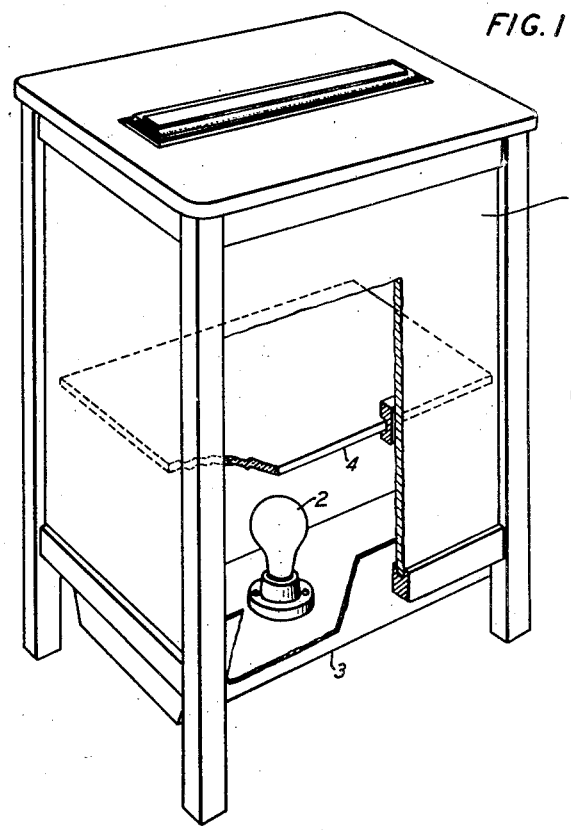
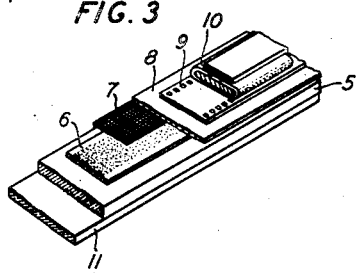
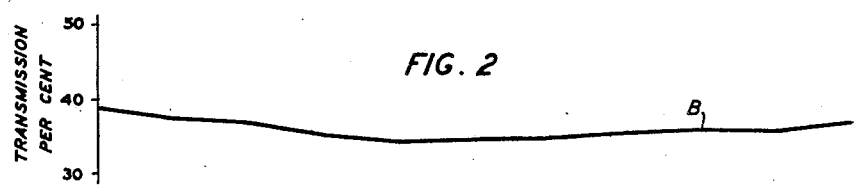
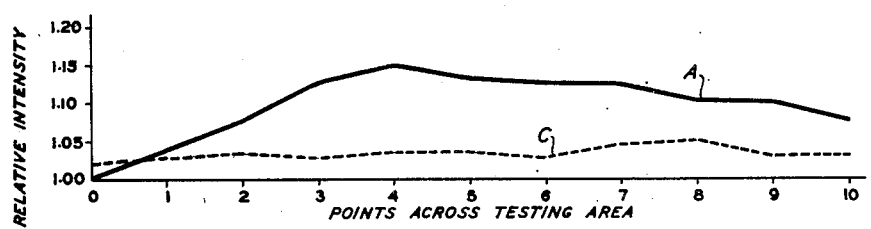
INVENTOR
F.L. EICH
BY
G. H. Heydt
ATTORNEY Patented Apr. 3, 1934

1,953,471

UNITED STATES PATENT OFFICE 1,953,471

OPTICAL INSTRUMENT

Ferdinand L. Eich, Los Angeles, Calif., assignor to Electrical Research Products, Inc., New York, N. Y., a corporation of Delaware Application January 5, 1932, Serial No. 584,804

2 Claims. (Cl. 95—5)

This invention relates to optical measuring instruments and more particularly to optical measuring instruments in which the object under test is exposed to a uniform diffused illumination.

The object of this invention is the provision of means for compensating for minor irregularities in the uniformity of illumination of the testing area of the instrument.

In many optical measuring and testing instruments, the object under test is illuminated by a uniform diffused area of light. As practical sources of light are generally of rather small area, a plurality of sources of light are used and a series of translucent screens interposed between the light sources and the object to be illuminated. It has been found, however, that such a system of illumination does not produce a precisely uniform area of light and that the degree of illumination varies considerably from point to point in the area. By careful design of the system, the variation in illumination may be reduced so that the brightest area is only about 10% brighter than the darkest area. But this variation, in many cases, is still too large for accurate work.

Also, when one of the light sources fails and must be renewed, the new light frequently causes a variation in the uniformity of illumination of the area. In accordance with the present invention, a transparent body, coated with photographic emulsion and covering the whole illuminated area, is exposed to the diffused light. The time of exposure is chosen so that the resultant exposure is entirely within the range of correct exposure. The negative is then developed in a neutral developer to unit contrast, washed, fixed and dried. The transmission of the negative will then be inversely proportional to the intensity of the light causing the exposure. The negative is mounted in the optical instrument between the diffusing screen and the object under test. By virtue of the exact inverse proportionality between the intensity of the light and the transmission of the negative, the light passing through the negative and illuminating the object will be substantially uniform over the whole area of the negative.

In those types of optical instrument in which the object under test is illuminated by light reflected by a reflecting surface, a similar irregularity in the reflected light is frequently encountered. In accordance with the present invention, a compensating tablet, exposed and developed as described above, may be introduced into the reflected light or the surface of the reflector may be coated with a photosensitive material which is exposed to the light, then developed to unit contrast and washed and fixed.

In the drawing:

Fig. 1 illustrates an optical instrument embodying the invention;

Fig. 2 shows various curves illustrating the effect of the invention;

Fig. 3 is a detailed view of the testing area of Fig. 1.

A simple form of sensitometer has been selected to illustrate the application of the invention to optical measuring instruments. The invention is not to be considered as limited to a device of the design illustrated but is obviously applicable to a wide variety of optical measuring instruments.

In Fig. 1, a cabinet 1, of any desired size encloses a source or sources of light 2 which may be partially surrounded by a reflector 3. The light from the source 2 is diffused by the screen 4, and falls on an opening of suitable size cut in the top of the cabinet 1.

As shown more clearly in Fig. 3, the opening in the cabinet 1 may be covered by a sheet of clear glass 5. When used as a sensitometer, a sensitometer strip 6 may be mounted on the glass sheet 5, and partially masked by an opaque mask 7. A transparent cover 8 protects the sensitometer strip 6 and mask 7. A section of photographic material 9, such as a piece of motion picture film, may be placed over the opening and held in place by the pad 10.

Measurements of the intensity of the light impressed on the sensitometer strip 6 of an actual sensitometer gave results as shown in curve A of Fig. 2. This curve shows that the intensity of the impressed light varies nearly 15% over the testing area.

A piece of photosensitive material may be placed on the glass sheet 5 and exposed for a time sufficient to bring the exposure within the region of correct exposure for the material used. The material is then developed in a neutral developer to a gamma of approximately unity, washed, fixed and dried. The transmission of the developed material was approximately as shown in curve B of Fig. 2.

The photosensitive material 11 developed as aforesaid may be mounted under the glass sheet 5, as shown in Fig. 3. Measurement of the intensity of the light impressed on the sensitometer strip 6 with the compensating tablet 11 in place gave results as shown in curve C of Fig. 2. To distinguish the curve from the axis, curve C has been plotted a little above its true location. It will be noted that the compensating tablet has reduced the variation in the impressed light from 15% to less than 3%.

A similar result may be obtained if the reflector 3 is coated with photosensitive emulsion, exposed to the light for a time which will bring the exposure within the region of correct exposure, developed to a gamma of unity in a neutral developer, washed and fixed. The variations in the transmission of the photographic image on the surface of the reflector will compensate for the irregularities in the intensity of the light falling on the reflector.

What is claimed is:

1. The method of correcting irregularities in the illumination of the testing area of an optical instrument which comprises producing an exposure in the region of correct exposure of an area of photosensitive material by the light transmitted through said testing area, developing said material to unit contrast, washing, fixing and drying said material and placing said material in said testing area in the position occupied during exposure.

2. The method of correcting irregularities in the illumination of the testing area of an optical instrument which comprises producing an exposure in the region of correct exposure of a transparent tablet coated with photosensitive material by the light transmitted through said testing area, developing said tablet to unit contrast, washing, fixing and drying said tablet and placing said tablet in said area in the position occupied during exposure.

FERDINAND L. EICH.